Nov. 24, 1953        L. P. POOL        2,660,038
GASEOUS HEAT EXCHANGE

Filed March 3, 1950        3 Sheets-Sheet 1

INVENTOR
LEONARD P. POOL

BY *James J. Shanley*

ATTORNEY

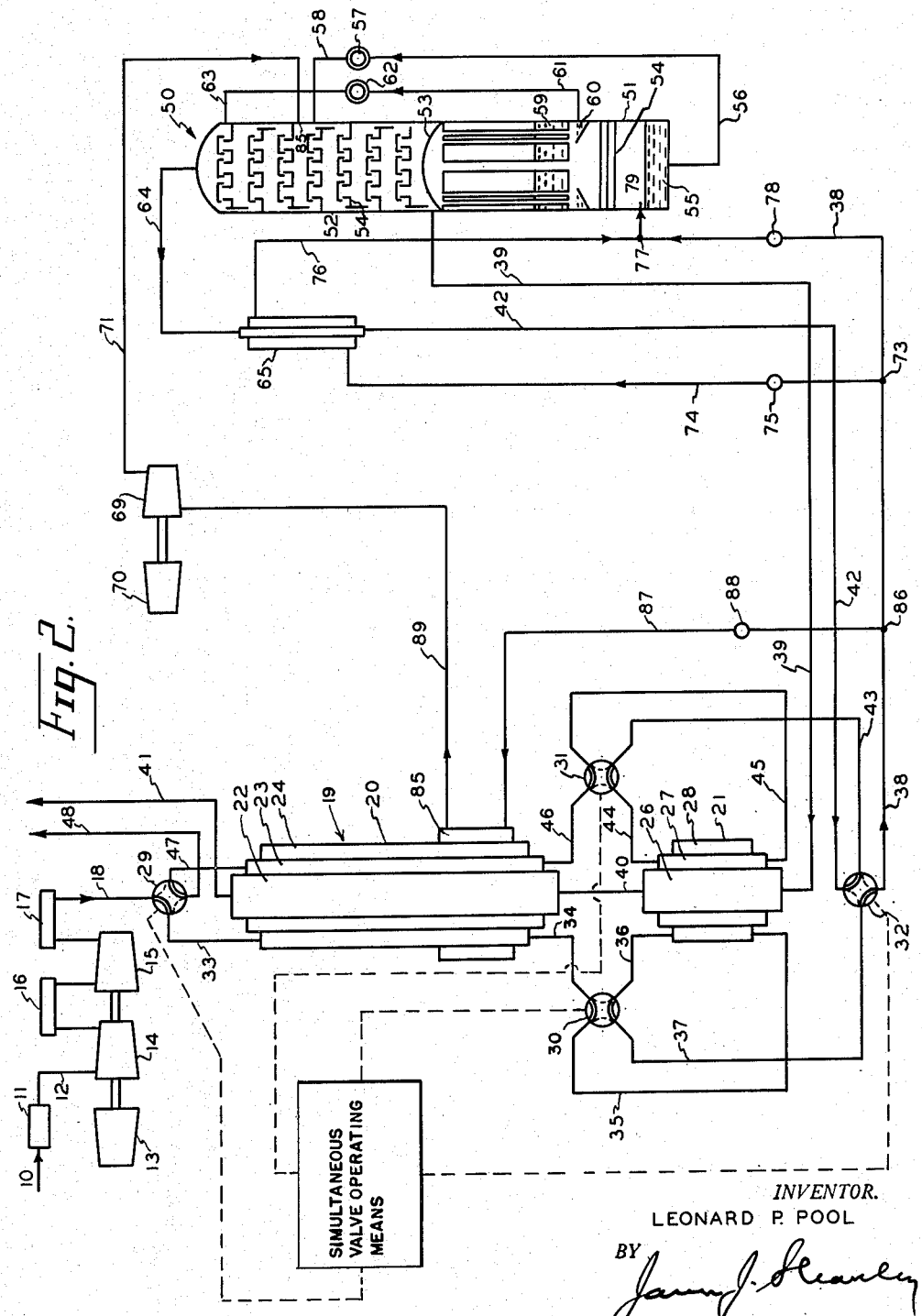

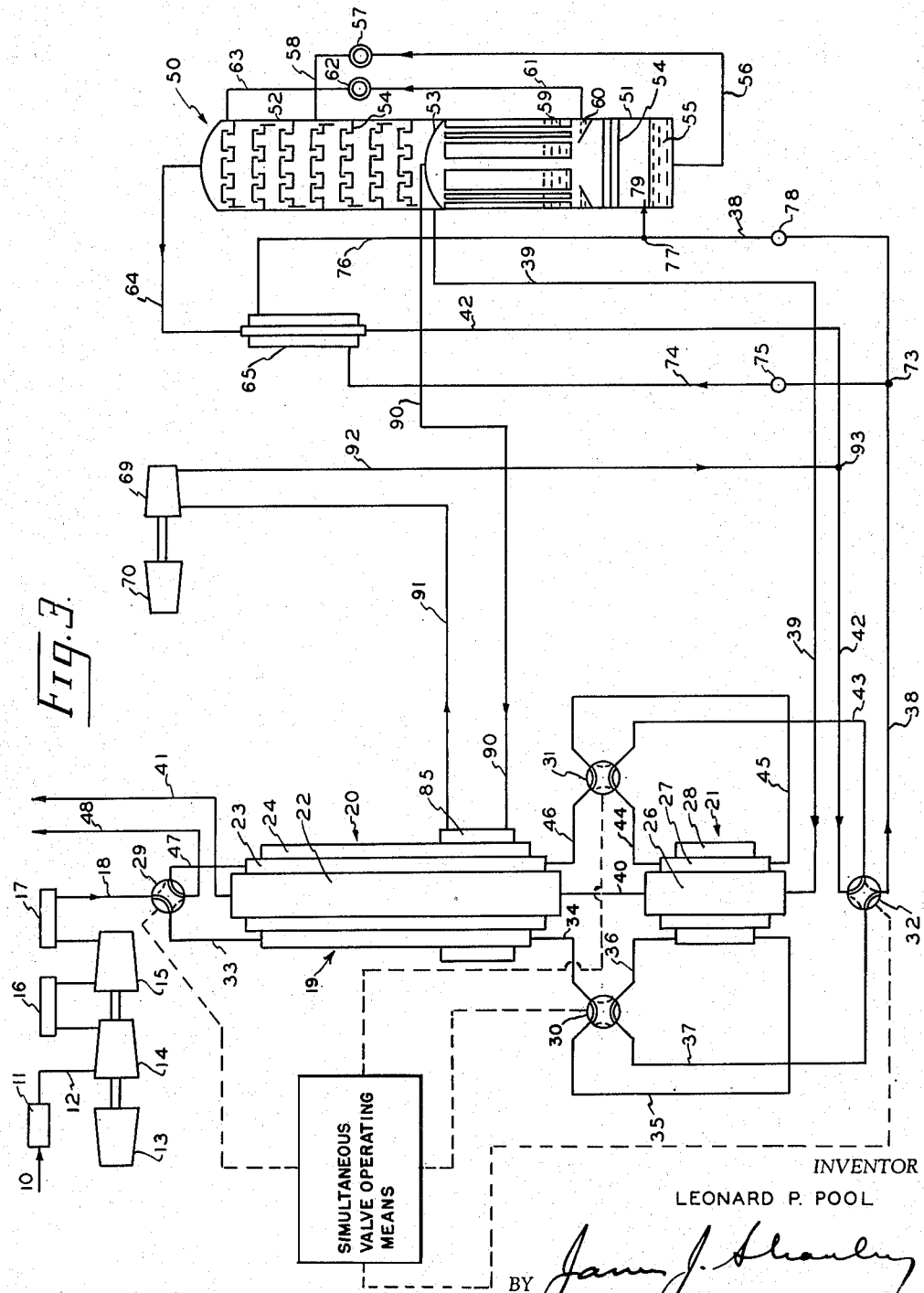

Patented Nov. 24, 1953

2,660,038

UNITED STATES PATENT OFFICE 2,660,038

GASEOUS HEAT EXCHANGE

Leonard Parker Pool, Allentown, Pa., assignor to Air Products, Incorporated, a corporation of Michigan Application March 3, 1950, Serial No. 147,419

21 Claims. (Cl. 62—123)

This invention relates to a method and apparatus for the separation of gas mixtures containing components of different boiling points, including the preliminary removal of one or more undesirable high boiling constituents from the mixture. More particularly, the present invention relates to a method and apparatus for the separation of air into an oxygen-rich fraction and a nitrogen-rich fraction including the elimination from the air of undesirable impurities, such as water vapor, carbon dioxide and other high boiling components prior to fractionation.

The separation of air, or other low-boiling gas mixtures, into the relatively pure major components has been accomplished by processes which include compressing and precooling the mixture, liquefaction of a portion of the mixture by heat interchange with a cold product of the separation, the expansion of another portion with external work, fractionation of the two portions in a fractionating column, and utilization of the cold products of the separation for the precooling of the incoming compressed mixture. In processes of this character, so-called cold exchangers have been employed to precool the gas mixture by countercurrent heat exchange with the cold products of the fractionation. One type of cold exchangers employed has been switching type interchangers which permit a simultaneous and efficient heat interchange between passageways in the interchangers containing countercurrently flowing streams of air and cold products of the fractionation. This form of interchanger comprises a plurality of parallel paths for the fluid forming each passageway which are so metal bonded to corresponding paths forming the other passageways as to establish a metal-to-metal thermal contact throughout the whole contact length of the vessel.

As the vapor pressures of the impurities found in air are extremely low at the temperatures at which the product gases emerge from an air fractionating column, these flow switching interchangers may readily be so operated as to refrigerate compressed atmospheric air, without preliminary purification or dessication, and deliver the refrigerated air in condition suitable for fractionation in a column. This is possible because, unlike the continuous flow interchanger, these forms permit the impurities deposited in cooling the air to be, at least in large part, removed by sublimation or evaporation when the flows are switched and the cold gas flows through the passages in which the impurities have been deposited. This removal is accomplished by periodically alternating the flow of warm incoming feed and a cold product of the fractionator between at least two passageways of the interchanger. That is, during one half of the cycle compressed air is being cooled in its passage through one passageway of the exchanger in countercurrent exchange with a stream of nitrogen in a second passageway and a stream of oxygen in a third passageway. During this period of flow, impurities are deposited on the heat-exchange surfaces of the one passageway. After an appropriate period, say several minutes, a mechanically operated valve mechanism switches and thus reverses the flow of air and nitrogen in the first two passageways. The compressed air now flows through the passageway previously handling nitrogen, and in reverse direction to that of the nitrogen. Nitrogen now flows where air has just passed, and in opposite direction to that of the air. The entering nitrogen contains none of the higher boiling impurities normally found in air, and is at approximately atmospheric pressure. It, therefore, has considerable capacity for the impurities precipitated on the surfaces of the passageway, and will, in fact, vaporize and carry them from the passageway. At the end of an equal period, the passageway will be clean of impurities and ready for the switchover to receive incoming air. The process in the second passageway is like the first, and through such repeated switchovers, the air is purified and the exchanger kept reasonably free from an accumulation of impurities. The oxygen stream is not switched and thus is brought out dry and clean.

The exchanger will maintain itself free of stoppages if the material balance on impurities shows no accumulation in any section of the exchanger. In other words, the amount of impurities carried out of any section by the leaving streams must be equal to the amount of impurities carried into that section by the entering streams. This is accomplished only if the conditions influencing the complete re-evaporation of the impurities are maintained throughout the regions of the apparatus containing the deposits of these materials. These conditions relate specifically to the provision of a sufficient volume of gas into which the deposits can be evaporated and removed, and to the maintenance of a sufficiently high vapor pressure of the deposited impurities which latter is governed by the temperature of the cold product in the region of the deposited impurities. The relative vapor pressure characteristics of water vapor are such that no difficulty is found in removing the deposited water at the pressure of the purging gas. However, in the case of carbon dioxide, the vapor pressure characteristics are such that it is difficult to obtain complete re-evaporation of the deposited carbon dioxide. Heretofore, the carbon dioxide has been substantially completely re-evaporated by passing a greater quantity of cold product gases over the deposited impurities than the quantity of air from which they were deposited. One way in which this condition has been attained has been by introducing into the system an additional quantity of high pressure air which has been previously purified by chemical means. This results in a larger quantity of product gases being available for the precooling step than the quantity of air which lays down the impurities in the pre-cooling step. This and similar systems for actually, or in effect, increasing the quantity of returning products over the amount of incoming air achieve the desired results by the "temperature approach" principle, wherein the temperature of the air in the cold end of the interchanger is brought into closer proximity with the temperature of the products with which it is in heat exchange relation. Maintaining a small difference in these temperatures results in a small difference between the vapor pressures of the impurities at the time of their precipitation and re-evaporation, and by maintaining the ratio of these vapor pressures equal to the ratio of the volume of air to the volume of nitrogen, the nitrogen thus becomes saturated with the impurities and is capable of removing substantially all of the impurities from the system at the same rate at which they have been deposited within the system.

The present invention utilizes a new concept for accomplishing the complete re-evaporation of the deposited impurities—namely, maintaining the nitrogen flowing through the zone where the impurities have been deposited at a temperature approximately equal to or higher than the temperature of the air at the time the impurities were deposited, as more particularly set out hereafter.

It is an important object of this invention to provide for a substantially complete re-evaporation of the solidified higher boiling impurities deposited in a switching cold interchanger.

It is a further important object of this invention to provide for warming the purging gas prior to its contact with the solidified impurities to a temperature approximately equal to or higher than the temperature at which the impurities were deposited so that substantially all of the solidified impurities are removed by the flow of the purging gas.

It is a still further important object of the invention to provide a method and apparatus in which the impurities depositing zone is mechanically shifted to a warmer zone of the interchanger with each reversal of the flow of the gases through the interchanger.

These and other objects are accomplished by the following invention wherein a substantially complete re-evaporation of the solidified higher boiling impurities deposited in the cold end of a switching cold interchanger is accomplished by separating the interchanger into a warm section and a cold section, and alternately interchanging the cold end and the warm end of the cold section thereof.

The invention is illustrated in the accompanying three sheets of drawings in which:

Fig. 2 is a diagrammatic view of a second form of the invention, and

Fig. 3 is a diagrammatic view of a third form of the invention.

Figure 1:
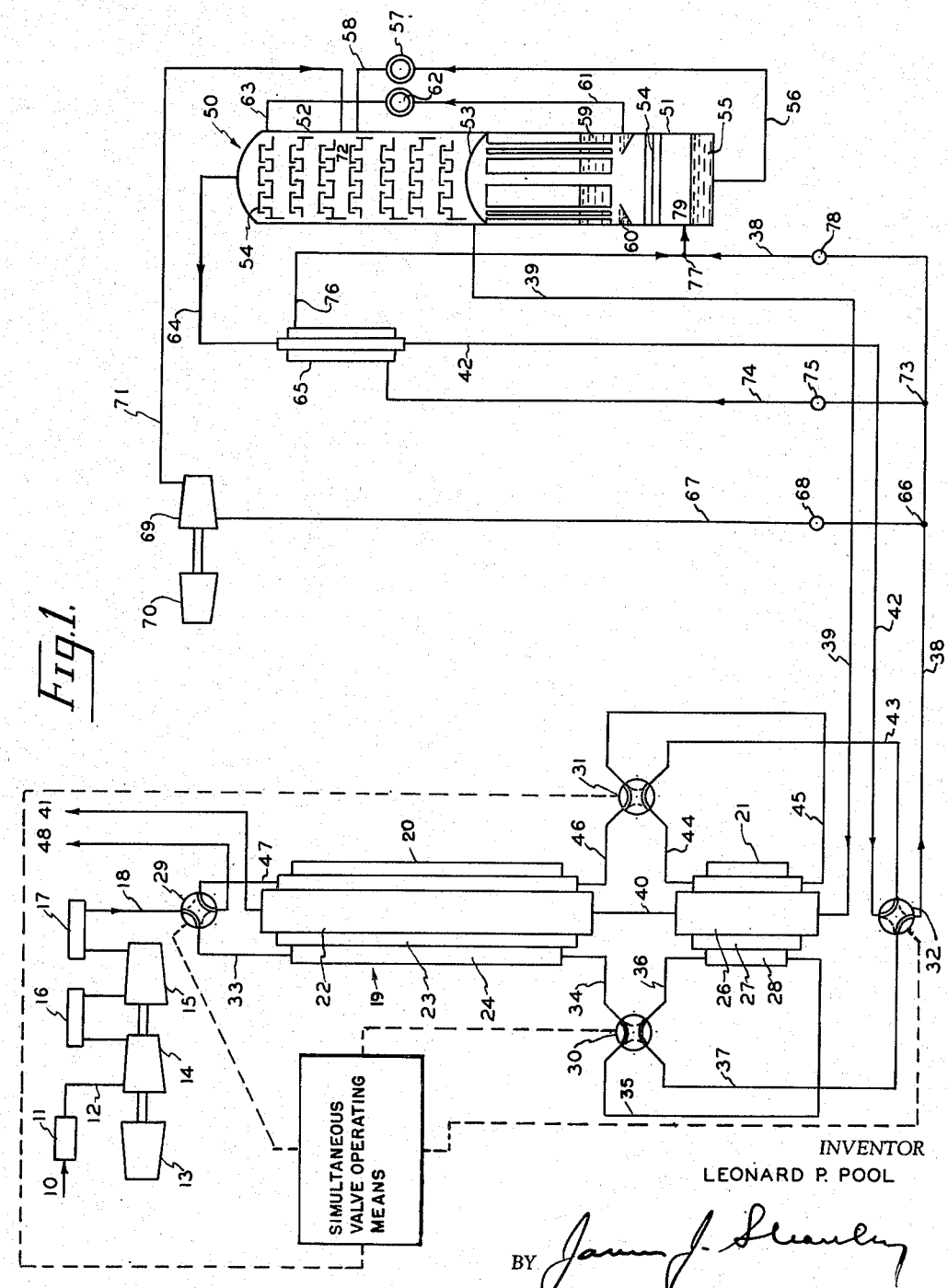
Fig. 1 is a diagrammatic view of one form of the invention.

Referring first to Fig. 1, air enters the system at 10 and is substantially freed from dust in an air cleaner 11. This element may be an electrostatic precipitator, a scrubber, or a simple air filter. The cleaned air passes at 12 to a compression unit consisting of a steam turbine or other power source 13, a first and a second stage turbocompressor 14 and 15, a water-cooled intercooler 16, and an aftercooler 17. The compressed air leaves the aftercooler via conduit 18 at a pressure in the neighborhood of 7 atmospheres and a temperature of about 300° Kelvin. The system includes an automatically switching heat interchanger 19 which is divided into a warm section 20 and a cold section 21. Both the warm section and the cold section of the heat interchanger comprise three passageways, 22, 23 and 24 in the warm section, diagrammatically illustrated as concentric to one another, and 26, 27 and 28 of similar configuration in the cold section thereof. The cold section of the heat interchanger is designed so as to cool the incoming air over a range about double the carbon dioxide deposition range, so that virtually all of the carbon dioxide impurity is deposited at the cold end of this section. Switching valves 29, 30, 31 and 32 are provided to direct the flow of the fluids. These valves are rotated through quarter turns in synchronism and at suitable intervals by suitable means shown only in diagrammatic form. The form of valve indicated is merely illustrative of one type of valve means that could be used. With these valves in the position shown in Figure 1, conduit 18 is connected to conduit 33 so that the incoming air passes through conduit 18, valve 29, conduit 33 and thence through passageway 24 in the warm section 20 of the heat interchanger. The air leaves passageway 24 through conduit 34, passing through switching valve 30, and conduit 35 to the lower end of passageway 28 in the cold section 21 of the heat interchanger. The air leaves passageway 28 through conduit 36, again passing through switching valve 30, and thence through conduit 37 to the switching valve 32 and conduit 38 leading to the fractionation apparatus to be described hereafter. The oxygen product from this fractionation operation flowing through conduit 39 is passed through passageway 26 of the cold section of the heat interchanger and thence through conduit 40 to passageway 22, through the warm section of the heat interchanger. The oxygen product passes out of the system through conduit 41. It should be noted that the oxygen product as illustrated always flows through the same passageways in the same direction through both heat interchanger sections. However, in some cases it may be more desirable to reverse the flow of the oxygen in the colder section 21 so that it always flows countercurrently to the air.

The nitrogen product from the fractionation operation flowing through conduit 42 is passed through the switching valve 32, conduit 43, switching valve 31, and thence to conduit 44 leading to the upper end of passageway 27 in the cold section of the heat interchanger. The lower end of passageway 27 is connected to conduit 45 leading to the switching valve 31 and thence to conduit 46 leading to the lower end of passageway 23 in the warm section of the heat interchanger. The upper end of passageway 23 is connected to conduit 47, switching valve 29 and outlet conduit 48.

When the valves are simultaneously rotated a quarter turn, the function of the described conduits are interchanged. The flow of the nitrogen gas will now be through conduit 42, valve 32, conduit 37, valve 30, and conduit 35, leading to the lower end of passageway 28 in the cold section of the heat interchanger. It should be noted that this passageway 28 previously carried the air which flowed in the same direction through the passageway. Prior to rotation of the valve, the nitrogen flowed through the cold section entering at the top of passageway 27 and leaving at the bottom thereof. In this manner, the cold end of the cold section of the heat interchanger is alternated between the top, as at the first setting of the valves, and the bottom upon rotation of the valves. The nitrogen leaves the passageway 28 through conduit 36, valve 30, and conduit 34 to the bottom of the passageway 24 through the warm section 20 of the heat interchanger. The passageway 24 previously carried the air entering at the top and leaving at the bottom. It will thus be seen that in the operation of this apparatus, the warm section of the heat interchanger will always have its warm end at the top where the air will enter first through passageway 24 and then upon rotation of the valve 29 through passageway 23. The nitrogen will always enter the warm section 20 through the bottom, first through passage 23 and then upon rotation of the valves through passageway 24. With valves 29, 30, 31, and 32 in the second position, incoming air will pass through valve 29 into conduit 47 and passageway 23 of warm section 20, thence through conduit 46, valve 31, conduit 44 to passageway 27 of cold section 21. From the cold section of the heat interchanger the air passes to the column through conduit 45, valve 31, conduit 43, valve 32 and conduit 38. From the above it will be apparent that in the cold section of the heat interchanger, the upper end thereof will alternately be the cold end and then the warm end due to the fact that the cold nitrogen gas will first enter the cold section through the top of passageway 27 and upon rotation of the valves 30, 31 and 32 will enter through the bottom of passageway 28 with the air flowing countercurrent thereto. Thus, the carbon dioxide will deposit first at the upper end of passageway 28, and upon rotation of the valves as described, the carbon dioxide deposition zone will be shifted to the lower end of passageway 27.

The nitrogen, after rotation of the valves will flow into the lower end of passageway 28 and will be warmed by heat interchange with the air flowing downwardly through passageway 27, so that by the time the nitrogen reaches the previously deposited carbon dioxide in the upper part of passageway 28, the nitrogen will have been warmed to a temperature which may be equal to or higher than the temperature at which the carbon dioxide was deposited therein. At the same time, the air cooled by the nitrogen will deposit virtually all of its carbon dioxide content in the lower end, now the colder end, of passageway 27. Upon again rotating the valves, the operations are interchanged, with the carbon dioxide deposited in the passageway 27 being evaporated by the warmed nitrogen flowing therethrough.

The fractionating column generally indicated at 50 may be any conventional column. The form shown consists of a high pressure section 51 and a low pressure section 52, separated by a partition plate and a refluxing nitrogen condenser 53. Each of the sections is provided with bubble plates 54. The air receives a preliminary fractionation in the high pressure section 51, and crude oxygen of more or less 40% purity collects in the base of the section as a pool 55, while more or less pure nitrogen vapor is partially condensed in the nitrogen condenser 53. The crude oxygen passes through conduit 56 and an expansion valve 57, and thence through conduit 58 to an intermediate point in the low pressure section. The nitrogen vapors rising in the high pressure section of the column are condensed in the nitrogen condenser 53 by heat interchange with the pool of product oxygen 59 which collects at the bottom of the low pressure section of the column. A portion of the condensed nitrogen flows downwardly through the high pressure section of the column to provide reflux therefor. The balance of the condensed nitrogen collects in a pool 60 just below the nitrogen condenser. The high pressure liquid nitrogen collecting in pool 60 is withdrawn through conduit 61, flowing thence through expansion valve 62 and conduit 63 to the upper end of the low pressure section. The intermediates thus introduced are refractionated in the low pressure section. Gaseous low pressure nitrogen is withdrawn from the top of the column through conduit 64 flowing through a liquefier 65 where it passes in heat exchange with and liquefies a portion of the incoming air. The gaseous nitrogen leaves the liquefier 65 through conduit 42, above referred to, leading to the main heat interchanger 19. Oxygen in a desired state of purity collects around the nitrogen condenser 53 in a pool 59 which surrounds the tubes of the nitrogen condenser. In condensing the high pressure nitrogen vapor within the tubes of the nitrogen condenser 53, the oxygen surrounding the tubes boils and its vapor passes upwardly through the column. A portion of the vapor is removed through conduit 39 leading to the heat interchangers.

To provide make-up refrigeration for the system to replace cold lost through heat leakage and imperfect heat exchange a portion of the cooled compressed air flowing in conduit 38 is diverted at point 66 through conduit 67 controlled by valve 68 leading to a turbo-expander 69. In the turbo-expander 69, the pressure of the air is reduced while doing work and the temperature of the gas is thus lowered. The turbo-expander 69 is coupled with a turbo-compressor or electric generator 70 for utilizing the work developed in any desired manner. The expanded air stream passes through conduit 71 to an intermediate point 72 in the low pressure section of the column. At point 73 in conduit 38, a portion of the incoming air is diverted through conduit 74, controlled by valve 75, and passed to liquefier 65 where it is liquefied by heat interchange with the effluent nitrogen product flowing from the column through conduit 64. The stream of liquefied air then passes through conduit 76 to the point 77 where it merges again with the remainder of the stream of incoming air passing through conduit 38 controlled by valve 78. The merged stream with the proper liquid to vapor ratio then passes into the high pressure section of the column as indicated at 79.

In the operation of this form of the invention, it will be seen that the warm compressed air will enter the upper end of the warm section of the heat interchanger and then will alternately enter the top and bottom of the cold section of the heat interchanger. The carbon dioxide present in the incoming air is deposited at the cold end of the cold section of the heat interchanger which is, as described, first at the bottom and then at the top thereof. The cold nitrogen stream alternately enters the bottom and top of the cold section of the heat interchanger through the passageway in which the carbon dioxide has been deposited. This stream is warmed before it reaches the carbon dioxide deposit, so that by the time it reaches the carbon dioxide deposit it is at a temperature approximately equal to or greater than the temperature at which the carbon dioxide was deposited and hence, has no difficulty in sweeping the carbon dioxide out. Additional cold is added to the system by passing a portion of the cold compressed air from the interchanger through a turbo-expander wherein the temperature of the stream is lowered and the stream is then passed to the fractionating column.

The cold section of the heat interchanger preferably cools the air through a temperature range at least twice the range in which the carbon dioxide is deposited. The following is a specific example of the temperatures of the streams flowing in the cold section of the heat interchanger. Assuming the air is compressed to approximately 7 atmospheres and contains in the neighborhood of 325 parts per million of carbon dioxide, the carbon dioxide content of the air will begin to deposit out of the air at a temperature of about 142° K. and will continue to deposit in measurable extent until cooled to about 117° K. The air stream at the latter temperature will have a carbon dioxide content of about 3 parts per million, which will not be deleterious to the operation of the system. With a mass volume of returning product equal to 100% of the incoming air used for scavenging, the returning products at approximately 1½ atmospheres pressure will remove all of the deposited carbon dioxide so long as the temperature of the products is above about 132.6° K. when the products first contact the deposited carbon dioxide. This is due to the fact that the maximum allowable temperature difference between the air and nitrogen has been found to be 9.4° K under such conditions. With 80% of the mass volume of the incoming air used for scavenging, the temperature of the products must be maintained above 133.8° when the products first contact the deposited carbon dioxide, this being the equivalent of $a\Delta T$ of 8.2° K. Thus, in the present example, the nitrogen stream enters the cold end of the cold section of the interchanger at about 85° K. and leaves the warm end thereof at about 174° K. The air stream enters the warm end of the cold section of the interchanger at about 180° K. and the cooled carbon dioxide-free air stream leaves the cold end at about 103° K. Thus it will be seen that at a point in the cold section of the interchanger where the temperature of the air has attained a temperature of about 142° K., the carbon dioxide will begin to deposit out. When the flow of the fluids is switched, the air will enter the opposite end of the cold section in the other passageway, thus depositing its carbon dioxide impurity in the opposite end of the section. The nitrogen now enters the passageway where the air previously entered, and the interchanger is so designed that the nitrogen will be warmed to a temperature above 133.8° K. before it reaches the zone in which the carbon dioxide has been previously deposited. At this, or any higher temperature of the nitrogen, all of the carbon dioxide will be removed when using a system wherein returning product or products in mass volume equal to about 80% of the incoming air is used for scavenging.

In the form of the invention shown in Figure 2, like figures designate similar pieces of apparatus. In general, the operation of the system is similar to that described with respect to Figure 1 with the exception that the portion of the cold compressed air stream from the interchanger flowing to the turbo-expander is first warmed to improve the cycle. This is accomplished by providing an additional passageway 85 through a portion of the length of the warm section 20 of the main interchanger 19. A portion of the air stream flowing through conduit 38 is diverted at point 86 through conduit 87, controlled by valve 88, leading to the passageway 85 through a portion of the warm section of the interchanger. As shown, passageway 85 passes through the lower or colder portion of the warm section. From the passageway 85, the stream is conducted through conduit 89 to the expander 69 where the air stream is expanded while doing work and the temperature of the gas is thus reduced. The expanded air stream passes through conduit 71 to the low pressure section of the column. In all other respects the operation of the system is identical with that described in connection with the embodiment shown in Figure 1.

In passing the cold compressed air stream through passageway 85 before the expansion step, the stream is warmed slightly, giving up a portion of its cold to the warm entering air stream in the interchanger. By warming the cold air stream slightly prior to its passage through the turbo-expander, the latter can be operated more efficiently with the liquefaction of any portion of the air stream being avoided to thereby increase the production of cold in the expander. The presence of liquid in the turbo-expander is also objectionable in that it causes a great deal of wear on the turbine blades requiring their frequent replacement.

The passage of the air stream through passageway 85 requires a slight change in the relative effective lengths of the two sections of the heat interchanger, but has no effect on the method of depositing and purging the carbon dioxide in the cold section of the interchanger.

In the embodiment of the invention shown in Figure 3, the cold compressed air stream from the interchanger does not pass through the turbo-expander. A portion of this stream is liquefied, as previously, in the liquefier 65, and the balance of the stream in gaseous form merges with the liquefied stream at point 77 and passes into the high pressure section of the column.

The make-up refrigeration in this embodiment is provided by removing a stream of high pressure nitrogen from the column through conduit 90 and passing this stream through the passageway 85 in the warm section of the interchanger. The stream leaves passageway 85 through conduit 91 and passes to the turbo-expander 69. In the turbo-expander the pressure of the stream is reduced to about the pressure of the product nitrogen while doing work and the temperature of the gas is reduced. The expanded nitrogen stream then passes through conduit 92 to the point 93 where it merges with the low pressure product nitrogen stream flowing from the column through conduit 42.

In flowing through the passageway 85 the high pressure nitrogen stream is warmed so that it may be subsequently expanded without the formation of liquid in the turbo-expander.

The operation of the carbon dioxide removal system is the same as in the embodiment shown in Figure 2.

It should be pointed out that even though a single multi-passageway heat interchanger is illustrated for both the oxygen and nitrogen products, it is possible to operate with a separate interchanger for the nitrogen product and one for the oxygen product. The air supply could be apportioned between the two interchangers so that the supply of air and of the returning product are equal in each interchanger, and each interchanger is operated so that the impurities are removed in accordance with the present invention. It is also possible to operate the oxygen interchanger conventionally with a smaller amount of incoming air than outgoing oxygen product, and applying the present invention to the nitrogen interchanger only.

Although the diagrammatic views in the drawings indicate the interchanger sections as unitary structures, obviously these sections may in practice include a plurality of heat interchanger units in series for facility in manufacture.

I claim:

1. A heat interchanger comprising a warm section having a warm end and a cold end, a cold section having a first end and a second end, a first and second passageway through the warm section, a first and second passageway through the cold section, a first set of conduit means for conducting a cooling fluid to the first passageway of the cold section at the first end thereof, from the first passageway of the cold section at the second end thereof to the first passageway of the warm section at the cold end thereof, and from the first passageway of the warm section at the warm end thereof, a second set of conduit means for conducting a cooling fluid to the second passageway of the cold section at the second end thereof, from the second passageway of the cold section at the first end thereof to the second passageway of the warm section at the cold end thereof, and from the second passageway of the warm section at the warm end thereof, first switching valve means associated with both first and second sets of conduit means for switching the flow of the cooling fluid from the first set of conduit means to the second set of conduit means, a third set of conduit means for conducting a fluid to be cooled to the second passageway of the warm section at the warm end thereof from the second passageway of the warm section at the cold end thereof to the second passageway of the cold section at the second end thereof and from the second passageway of the cold section at the first end thereof, a fourth set of conduit means for conducting the fluid to be cooled to the first passageway of the warm section at the warm end thereof from the first passageway of the warm section at the cold end thereof to the first passageway of the cold section at the first end thereof, and from the first passageway of the cold section at the second end thereof, second switching valve means associated with both third and fourth sets of conduit means for switching the flow of the fluid to be cooled from the third set of conduit means to the fourth set of conduit means, and means for operating the first and second switching valve means simultaneously so that the cooling fluid and the fluid to be cooled flow through both of the first and second passageways respectively and then through both of the second and first passageways respectively.

2. A heat interchanger as described in claim 1 which is utilized for cooling a mixture of gases to be fractionated and for freezing out a higher boiling impurity therein, the interchanger being so constructed that the higher boiling impurity will be deposited in the cold section of the interchanger.

3. Apparatus in accordance with claim 2 wherein the cold section of the interchanger is of such length as to cool the mixture of gases over a range at least twice the higher boiling impurity deposition range.

4. In combination with air fractionating apparatus including an air fractionating column, a heat interchanger adapted to refrigerate and purify a stream of compressed air by heat interchanger with a stream of cold expanded gaseous nitrogen product from the fractionation of the air stream and by precipitation of the carbon dioxide impurity in the air stream, comprising a warm section having a warm end and a cold end, a cold section having a first end and a second end, a first and second passageway through the warm section, a first and second passageway through the cold section, a first set of conduit means for conducting the nitrogen product to the first passageway of the cold section at the first end thereof, from the first passageway of the cold section at the second end thereof to the first passageway of the warm section at the cold end thereof, and from the first passageway of the warm section at the warm end thereof, a second set of conduit means for conducting the nitrogen product to the second passageway of the cold section at the second end thereof, from the second passageway of the cold section at the first end thereof to the second passageway of the warm section at the cold end thereof, and from the second passageway of the warm section at the warm end thereof, first switching valve means associated with both sets of conduit means for switching the flow of the nitrogen product from the first set of conduit means to the second set of conduit means, a third set of conduit means for conducting the air stream to the second passageway of the warm section at the warm end thereof, from the second passageway of the warm section at the cold end thereof to the second passageway of the cold section at the second end thereof and from the second passageway of the cold section at the first end thereof, a fourth set of conduit means for conducting the air stream to the first passageway of the warm section at the warm end thereof, from the first passageway of the warm section at the cold end thereof to the first passageway of the cold section at the first end thereof, and from the first passageway of the cold section at the second end thereof, second switching valve means associated with both sets of conduit means for switching the flow of the air stream from the third set of conduit means to the fourth set of conduit means, and means for operating the first and second switching valve means simultaneously so that the nitrogen and air flow through both of the first and second passageways respectively, and then through both of the second and first passageways respectively.

5. Apparatus in accordance with claim 4 wherein the interchanger is so constructed that the carbon dioxide impurity deposits in the cold section of the interchanger.

6. Apparatus in accordance with claim 5 wherein the cold section of the interchanger is of such length as to cool the air stream over a range at least twice the carbon dioxide deposition.

7. Apparatus in accordance with claim 4 comprising a third passageway through the warm section of the interchanger, and expander, and a fifth set of conduit means for conducting a portion of the air stream leaving the cold section of the interchanger to the third passageway, through the warm section of the interchanger, from the third passageway through the warm section to the expander, and from the expander to the fractionating column.

8. Apparatus in accordance with claim 4 comprising a third passageway through the warm section of the interchanger, an expander, a two stage fractionating column, and a first set of conduit means for conducting a portion of the gaseous nitrogen product from the higher pressure stage of the column to the third passageway through the warm section of the interchanger, from the third passageway through the warm section to the expander, and from the expander to merge with the nitrogen product from the lower pressure stage of the column flowing to the cold section of the interchanger.

9. A heat interchanger comprising a warm section having a warm end and a cold end and a cold section having a first end and a second end, a first and second passageway through the warm section, a first and second passageway through the cold section, warm end conduit means connecting the first and second passageways of the warm section at the warm end thereof to a point of fluid disposal and a source of fluid to be cooled, respectively, switching valve means associated with the warm end conduit means for connecting the first passageway with the source of fluid to be cooled and the second passageway with the point of fluid disposal, inter-section conduit means connecting the first and second passageways of the warm section at the cold end thereof with the first and second passageways, respectively, of the cold section at the second end thereof, switching valve means associated with thhe inter-section conduit means for connecting the first and second passageways of the warm section at the cold end thereof with the first and second passageways, respectively, of the cold section at the first end thereof, cold end conduit means connecting the first and second passageways at the first end of the cold section with a source of cooling fluid and a point of fluid disposal, for the cooled fluid, respectively, switching valve means associated with the cold end conduit means for connecting the first and second passageways at the second end of the cold section with a point of fluid disposal for the cooled fluid and a source of cooling fluid, respectively, whereby the first end of the cold section becomes alternately the warm end and then the cold end thereof.

10. Apparatus in accordance with claim 9 which is utilized for cooling a stream of compressed air and for depositing out the carbon dioxide impurity contained therein, the warm and cold sections of the interchanger being so proportioned that the carbon dioxide will be deposited in the cold section of the interchanger.

11. The method of continuously cooling a stream of fluid to be cooled by heat interchange with a cooling fluid in a plurality of elongated heat interchange zones comprising passing the stream of fluid to be cooled through first and second of the zones in series, passing the stream of cooling fluid through third and fourth of the zones in series, the first and fourth zones being in heat interchange relation with the streams therein in countercurrent flow relation and the second and third zones being in heat interchange relation with the streams therein in countercurrent flow relation whereby the stream of fluid to be cooled becomes progressively cooler in passage through each zone, switching the flow of the streams through the first and fourth zones so that the stream to be cooled flows through the fourth zone and the stream of cooling fluid flows through the first zone but without changing the direction of flow of either of these streams through these zones, and simultaneously switching the flow of the streams through the second and third zones so that the stream of fluid to be cooled flows through the third zone and the stream of cooling fluid flows through the second zone but with the direction of flow of both of these streams through these zones reversed.

12. The method of claim 11 in which the fluid to be cooled is a compressed mixture of low boiling gases to be fractionated and the cooling fluid is a product of the fractionation at lower pressure.

13. The method of claim 12 in which the mixture of low boiling gases contains a higher boiling impurity and in which the reduction in temperature of the stream of fluid to be cooled as it progresses through the zones results in the impurity being precipitated from the mixture of low boiling point gases in the colder portion of the second and third zones.

14. The method of claim 13 in which the mixture of low boiling gases is cooled in the second and third zones through a temperature range at least twice that in which precipitation of the impurity occurs.

15. The method of claim 12 in which the mixture of gases is air and the product nitrogen.

16. The method claimed in claim 13 in which the mixture is air, the product nitrogen and the impurity carbon dioxide.

17. The method of claim 14 in which the mixture is air, the product nitrogen and the impurity carbon dioxide.

18. In the continuous cooling of a stream of a compressed mixture of low boiling gases containing a higher boiling normally gaseous impurity by heat interchange with a stream of a cooling fluid at a lower pressure, in which the streams are alternatively passed in counter current flow relation through heat interchange passages where the fluid to be cooled is progressively cooled first in one passage and then another to a temperature such that impurity is deposited in the one passage and then the other, and the cooling fluid is passed first through the other passage and then through the one passage to act as the coolant and to remove deposited impurity, the method of insuring complete removal of the deposited impurity by the stream of cooling fluid during flow of the cooling fluid through each passage comprising, warming up the stream of cooling fluid in such passage by heat interchange against the stream of fluid to be cooled prior to contacting the deposited impurity with the cooling fluid so that the difference in temperature between the fluid to be cooled when depositing the impurity and the cooling fluid when contacting the deposited impurity is less than would exist if the stream of cooling fluid had not been so warmed.

19. The method of claim 18 in which the mixture of gases is air, the impurity carbon dioxide and the cooling fluid a product of fractionation of air.

20. The method of continuously cooling a first stream of fluid containing a higher boiling impurity and completely removing said impurity with a second stream of cooling fluid which comprises passing the first stream of fluid through a passage in countercurrent heat exchange relation to said second stream of fluid flowing in a second passage and thereby depositing said impurity toward the colder end of said first passage and then reversing the directions of flow of said first and second fluid streams while interchanging their passages of flow.

21. The method of claim 20 in which the first stream of fluid is air, the higher boiling impurity is carbon dioxide, and the second stream of fluid is a product of fractionation of air.

LEONARD PARKER POOL.

References Cited in the file of this patent

UNITED STATES PATENTS

| Number | Name | Date |
|---|---|---|
| 2,460,859 | Trumpler | Feb. 8, 1949 |
| 2,490,750 | Grewin | Dec. 6, 1949 |
| 2,503,939 | De Baufre | Apr. 11, 1950 |
| 2,504,051 | Scheibel | Apr. 11, 1950 |
| 2,553,550 | Collins | May 22, 1951 |
| 2,562,812 | Ogorzaly | July 31, 1951 |